(12) United States Patent
Mori et al.

(10) Patent No.: US 8,611,906 B2
(45) Date of Patent: *Dec. 17, 2013

(54) MOBILE COMMUNICATIONS SYSTEM, GENERAL BASE STATION APPARATUS, BASE STATION APPARATUS, AND BASE STATION STATUS CONTROL METHOD

(75) Inventors: Shinichi Mori, Yokohama (JP); Akira Ishii, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 12/672,851

(22) PCT Filed: Jul. 25, 2008

(86) PCT No.: PCT/JP2008/063393
§ 371 (c)(1),
(2), (4) Date: Jun. 7, 2010

(87) PCT Pub. No.: WO2009/022534
PCT Pub. Date: Feb. 19, 2009

(65) Prior Publication Data
US 2011/0130143 A1    Jun. 2, 2011

(30) Foreign Application Priority Data

Aug. 13, 2007    (JP) ................. 2007-211092

(51) Int. Cl.
*H04W 36/00*    (2009.01)
(52) U.S. Cl.
USPC .......... 455/444; 455/432.1; 455/435.1; 455/436; 455/442; 455/453; 370/331; 370/332; 370/333

(58) Field of Classification Search
USPC .......... 455/432.1–453, 455–456.6; 370/328–334
See application file for complete search history.

(56) References Cited

U.S. PATENT DOCUMENTS

| 6,975,879 B1 * | 12/2005 | Aalto et al. ............ 455/522 |
| 2001/0021650 A1 * | 9/2001 | Bilgic ............ 455/418 |

FOREIGN PATENT DOCUMENTS

| JP | 06-269039 A | 9/1994 |
| JP | 7-170566 A | 7/1995 |
| JP | 10-023519 A | 1/1998 |
| JP | 10-145842 A | 5/1998 |
| JP | 2003-174456 A | 6/2003 |
| WO | 2005/065214 A2 | 7/2005 |

OTHER PUBLICATIONS

Patent Abstracts of Japan, Publication No. 06-269039, dated Sep. 22, 1994, 1 page.

(Continued)

*Primary Examiner* — Dai A Phuong
(74) *Attorney, Agent, or Firm* — Osha Liang LLP (57) ABSTRACT

A mobile communications system is disclosed. The mobile communications system includes a first unit, provided at a base station apparatus, which controls a base station status by determining a request from an upper-layer general base station apparatus; and a second unit, provided at the general base station apparatus, which monitors for one or more mobile station apparatuses entering into/appearing in, or exiting/disappearing from a cell formed by the general base station apparatus, and, if at least one of the mobile station apparatuses enters into/appears in the cell formed by the general base station apparatus, requests for changing the base station apparatus to a service status, and, if all of the mobile station apparatuses exit/disappear from the cell formed by the general base station apparatus, requests for changing the base station apparatus to a radio unit stop status.

7 Claims, 5 Drawing Sheets

(56) References Cited

OTHER PUBLICATIONS

Patent Abstracts of Japan, Publication No. 10-145842, dated May 29, 1998, 1 page.
Patent Abstracts of Japan, Publication No. 07-170566, dated Jul. 4, 1995, 1 page.
3GPP TSg RAN #35, RP-070209, "Requirements for LTE Home eNodeBs," Lemesos, Cyprus, Mar. 6-9, 2007, 4 pages.
International Search Report issued in PCT/JP2008/063393, mailed on Nov. 4, 2008, with translation, 9 pages.
Written Opinion issued in PCT/JP2008/063393, mailed on Nov. 4, 2008, 3 pages.
Japanese Office Action for Application No. 2009-528072, mailed on Sep. 25, 2012 (4 pages).
Patent Abstracts of Japan for Japanese Publication No. 2003-174456, publication date Jun. 20, 2003 (1 page).
Patent Abstracts of Japan for Japanese Publication No. 10-023519, publication date Jan. 23, 1998 (1 page).

* cited by examiner

MOBILE COMMUNICATIONS SYSTEM, GENERAL BASE STATION APPARATUS, BASE STATION APPARATUS, AND BASE STATION STATUS CONTROL METHOD

BACKGROUND OF THE INVENTION

1. Field of the Invention

The present invention relates to mobile communications systems, general base station apparatuses, base station apparatuses, and base station status control methods.

2. Description of the Related Art

After a service is initiated by a network manager, a base station for public communications in a mobile communications system regularly provides the service to respond to a connection request from a user that takes place irregularly.

For example, tasks for initiating by the network manager are performed as follows:

(1) The base stations are installed and various line connections are made, after which the power is turned on and circuits to an upper-layer node are opened to traffic.

(2) Various parameters are set in the base stations via a network or by direct manual entry.

After the settings are incorporated to initiate the base station service, the service continues as much as possible without interruption except when restart is needed due to change in apparatus configuration, failure, etc. Moreover, when dismantling a base station, the base station service is terminated and the power is turned off.

What is described above is an operation for the base station for the public communications, but a basically similar operation is expected for a base station to be installed in a small area such as a home, which base station is called a home base station (Home eNodeB, see Non-patent document 1).

Non-patent document 1: 3GPP TSG RAN #35 RP-070209 Lemesos, Cyprus, 6-9 March 2007 (http://www.3gpp.org/ftp/tsg_ran/TSG_RAN/TSGR_35/Docs/)

SUMMARY OF THE INVENTION

[Problem(s) to be Solved by the Invention]

As described above, the conventional base station provides the service regularly. Thus, the followings problems are pointed out with respect to the home base station.

(1) At a base station for specific users (a closed subscriber group: CSG), there are limited users from which a connection request is made, so that transmission from a base station with no such users in the vicinity ends up becoming wasted.

(2) Such a status as described above causes not only wasted power, but also interference with other cells due to a common control channel transmitted from the base station even when the user is not connected. The interference causes degradation in communications quality for a user unrelated to the base station for the specific users. Moreover, the interference causes a decrease in communications capacity for a base station unrelated to the base station for the specific users as described above.

(3) It is expected that a large number of the base stations for the specific users (for example, one base station per family) will be installed. Thus, the harmful effects as described above become a problem which is large and not to be ignored.

On the other hand, while an operation may be considered such that the user of the base station for the specific users manually initiates and stops the base station, there exist the following problems.

(4) A communications handover being conducted may fail before initiating the base station. For example, when moving from a status of communicating outdoors with a base station for public communications to a status of entering into a house in which the base station for the specific users is installed, a communications handover may fail due to manual initiating of the base station for the specific users being not on time.

(5) stopping of an apparatus that takes into account other users of the base station (other members of the family) may be called for, making the operation more complicated, thereby causing the initiating and stopping of the base station to become devoid of substance.

[Means for Solving the Problem]

In order to solve the above problems, one embodiment of the present invention is arranged to provide a mobile communications system, including: a first unit, provided at a base station apparatus, which controls a base station status by determining a request from an upper-layer general base station apparatus; and a second unit, provided at the general base station apparatus, which monitors for one or more mobile station apparatuses entering into/appearing in, or exiting/disappearing from a cell formed by the general base station apparatus, and, if at least one of the mobile station apparatuses enters into/appears in the cell formed by the general base station apparatus, requests for changing the base station apparatus to a service status, and, if all of the mobile station apparatuses exit/disappear from the cell formed by the general base station apparatus, requests for changing the base station apparatus to a radio unit stop status.

[Advantage of the Invention]

The disclosed mobile communications system, the general base station apparatus, the base station apparatus, and the base station status control method make it possible to decrease the effect of interference on the surroundings and the power consumption of the apparatuses without troubling the user or the owner of the base station for the specific users.

DESCRIPTION OF THE PREFERRED EMBODIMENTS

[Description of Notations]

1, 1#1 through 1#3 general macro base station; 101 receive antenna; 102 unit for receiving from mobile station; 103 transmit antenna; 104 unit for transmitting to mobile station; 105 base station-housed circuits; 106 X2 interface; 107 interface unit; 108 unit for receiving from home base station; 109 unit for transmitting to home base station; 110 home base station status controller; 111 home base station user controller; 112 visiting mobile station database; 113 visiting mobile station monitoring unit; 114 status control instruction generating unit; 115 held data erasing unit; 2 home base station; 201 receive antenna; 202 unit for receiving from mobile station; 203 transmit antenna; 204 unit for transmitting to mobile station; 205 base station-housed circuits; 206 X2 interface;

207 interface unit; 208 radio unit status controller; 3#1 through 4#3 macro cell; 4 home cell; 5#1 through 5#3 mobile station; X2 X2 interface

[Best Mode of Carrying Out the Invention]

According to an embodiment of the present invention, a mobile communications system is provided, the mobile communications system including: a first unit, provided at a base station apparatus, which controls a base station status by determining a request from an upper-layer general base station apparatus; and a second unit, provided at the general base station apparatus, which monitors for one or more mobile station apparatuses entering into/appearing in, or exiting/disappearing from a cell formed by the general base station apparatus, and, if at least one of the mobile station apparatuses enters into/appears in the cell formed by the general base station apparatus, requests for changing the base station apparatus to a service status, and, if all of the mobile station apparatuses exit/disappear from the cell formed by the general base station apparatus, requests for changing the base station apparatus to a radio unit stop status.

Preferably, the second unit monitors for the mobile apparatus which is authorized to access the base station apparatus entering into/appearing in, or exiting/disappearing from the cell formed by the general base station apparatus.

Preferably, the second unit monitors for a mobile station apparatus entering into/appearing in, or exiting/disappearing from a cell combined with a cell formed by other general base station apparatuses.

Moreover, according to an embodiment of the present invention, a general base station apparatus is provided, the general base station apparatus including: a unit which monitors for one or more mobile station apparatuses entering into/appearing in, or exiting/disappearing from a cell formed by the general base station apparatus, and, if at least one of the mobile station apparatuses enters into/appears, requests for changing the base station apparatus to a service status, and, if all of the mobile station apparatuses exit/disappear, transmits, to the base station apparatus, a report requesting to change the base station apparatus to a radio unit stop status.

Preferably, the unit for transmitting to the base station apparatus monitors for the mobile apparatus authorized to access the base station apparatus entering into/appearing in, or exiting/disappearing from the cell.

Preferably, the unit for transmitting to the base station apparatus monitors for the mobile station apparatus entering into/appearing in, or exiting/disappearing from a cell combined with a cell formed by other general base station apparatuses.

Furthermore, according to an embodiment of the present invention, a base station apparatus is provided, the base station apparatus including a unit which moves the own apparatus between a service status and a radio unit stop status by determining a report from an upper-layer general base station apparatus.

Moreover, according to an embodiment of the present invention, a method of controlling base station status is provided, the method including the step of monitoring for one or more mobile station apparatuses entering into/appearing in, or exiting/disappearing from a cell formed by the general base station apparatus, and, if at least one of the mobile station apparatuses enters into/appears in the cell formed by the general base station apparatus, requesting for changing the base station apparatus to a service status, and, if all of the mobile station apparatuses exit/disappear from the cell formed by the general base station apparatus, requesting to change the base station apparatus to a radio unit stop status.

Preferably, the step includes monitoring for the mobile apparatus authorized to access the base station apparatus entering into/appearing in, or exiting/disappearing from the cell formed by the general base station apparatus.

Preferably, the step includes monitoring for the mobile station apparatus entering into/appearing in, or exiting/disappearing from a cell combined with a cell formed by other general base station apparatuses.

Preferably, the base station apparatus is further arranged to change to a radio unit stop status only when it is requested to change to the radio unit stop status from all of upper-layer general base station apparatuses.

Below, preferred embodiments of the present invention will be described.

System Configuration

Figure 1:
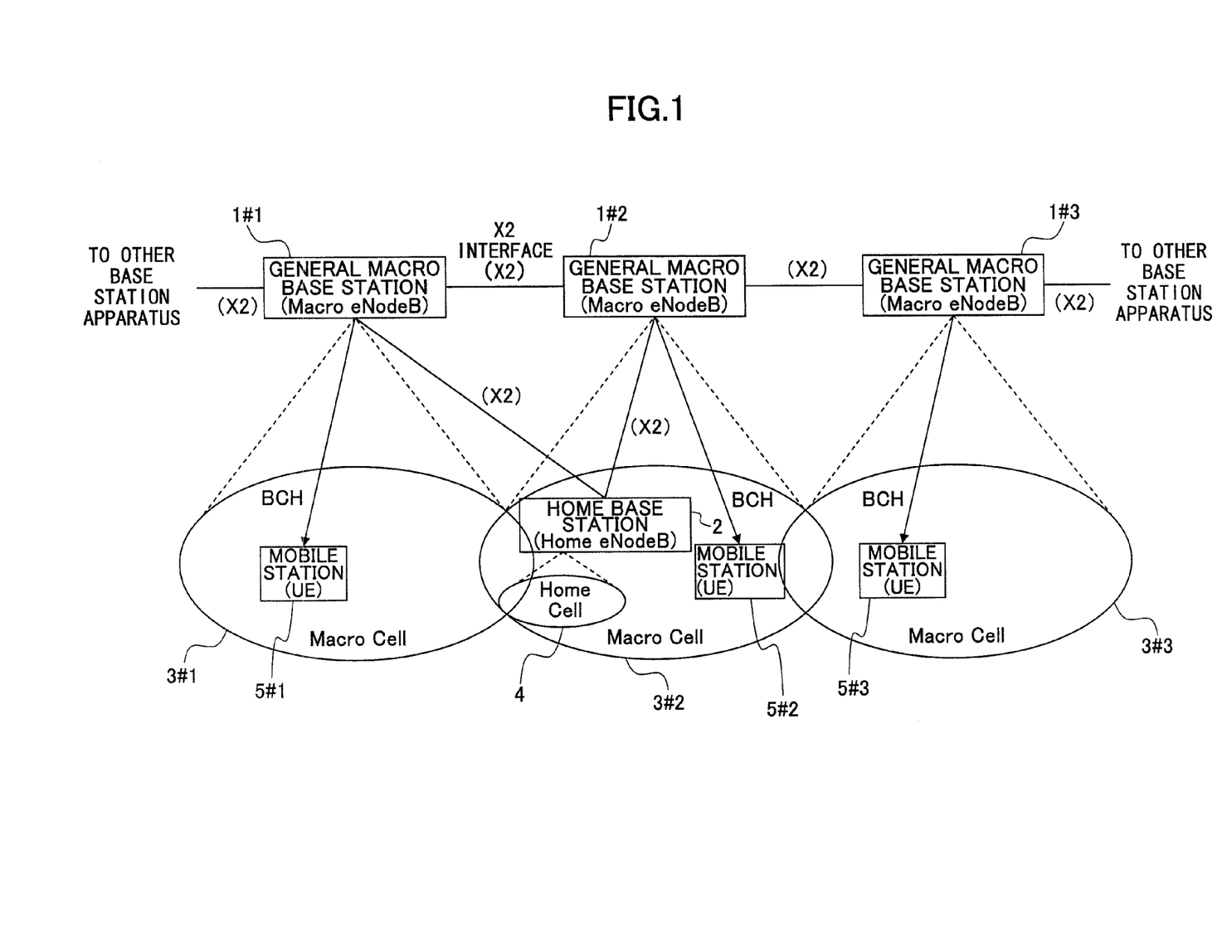
FIG. 1 is a diagram illustrating an exemplary configuration of a mobile communication system according to one embodiment of the present invention.

FIG. 1 is a diagram illustrating an exemplary configuration of a mobile communications system according to one embodiment of the present invention.

In FIG. 1, general macro base stations (macro eNodeBs) 1#1, 1#2, and 1#3 which are mutually in the vicinity are mutually connected to a base station (Home eNodeB) 2 via an X2 interface based on a mesh topology. The X2 interface may be set over a fixed dedicated circuit, or may be logically set over a fixed circuit via some upper-layer node. The Internet, dedicated circuits, FTTH (fiber to the home), ADSL (asymmetric digital subscriber line), etc., are used for the fixed circuit. Using the X2 interface, one of the base stations performs, with the other base stations, control of a mobile station in conjunction with a mobile station handover, transfer of user data and control data, and status control of the home base station.

Types of base stations include general macro base stations 1#1, 1#2, and 1#3 which control the home base station 2, a normal macro base station which does not control the home base station 2, and the home base station 2. Here, the general macro base stations 1#1, 1#2, and 1#3 and the normal macro base station are relatively large base stations installed by a communications operator, while the home base station 2 is a small base station installed by an individual, etc. As shown, the normal macro base station is omitted.

An area covered by a sector of the general macro base station 1#1 is a macro cell 3#1, an area covered by a sector of the general macro base station 1#2 is a macro cell 3#2, and an area covered by a sector of the macro base station 1#3 is a macro cell 3#3. Between neighboring macro cells 3#1 and 3#2, and between neighboring macro cells 3#2 and 3#3, there are respective small overlap portions for smoothly conducting a handover. An area covered by the home base station 2 is a home cell 4.

Moreover, the macro cells 3#1 and 3#2 which overlap with the home cell 4 are cells overlaying the home cell 4. In this way, when it is possible to receive radio signals from multiple general macro base stations in case the home cell is located at an overlapping portion between multiple macro cells, etc., multiple cells overlaying the home cell may exist.

The macro cells 3#1, 3#2, and 3#3 are visited by mobile stations (UE: user equipment units) 5#1, 5#2 and 5#3 carried by a user. Here, the mobile station 5#1 captures a common control channel such as a BCH (broadcast channel), etc., from the general macro base station 1#1, the mobile station 5#2 captures a common control channel such as the BCH, etc., from the general macro base station 1#2, and the mobile station 5#3 captures a common control channel such as the BCH, etc., from the general macro base station 1#3. Moreover, as the mobile stations 5#1, 5#2, and 5#3, a general configuration used in this type of mobile communications system is assumed.

Figure 2:
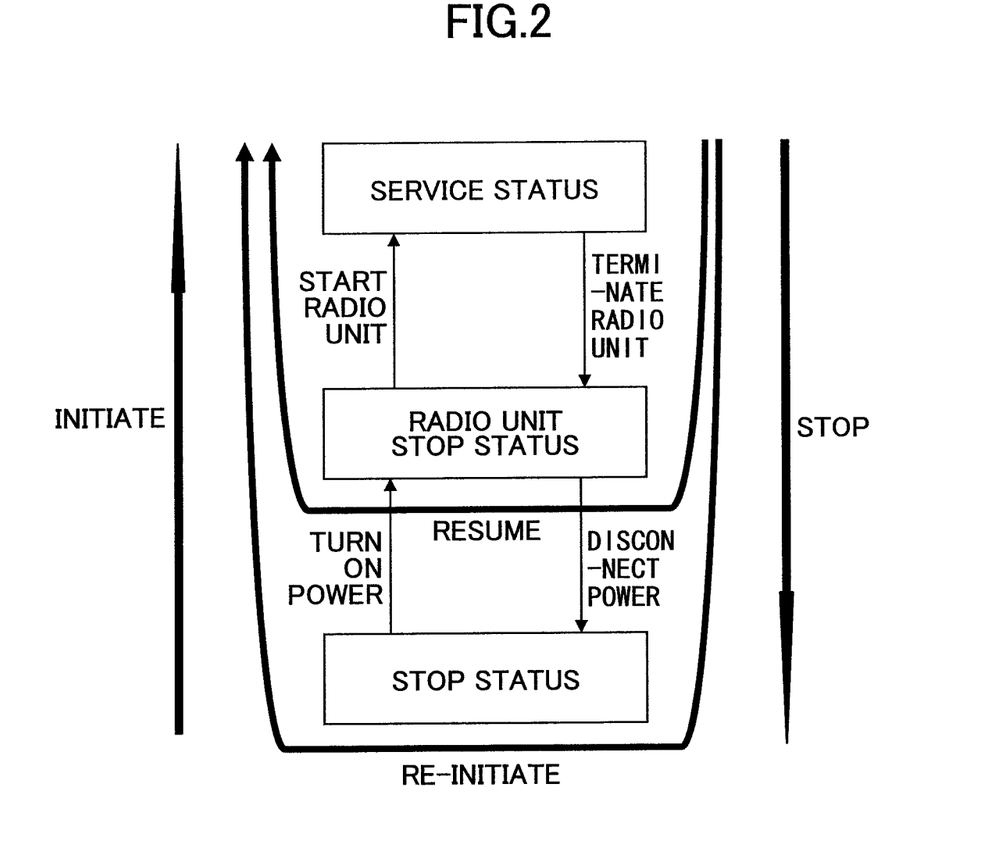
FIG. 2 is a diagram illustrating statuses of a home base station.

FIG. 2 is a diagram illustrating statuses of the home base station 2, which statuses include: a "stop status", in which the apparatus power is not turned on; a "radio unit stop status", in which the apparatus power is turned on, but the radio unit power is stopped; and a "service status", in which the radio unit power is provided. Turning on the power causes a change from the "stop status" to the "radio unit stop status", while disconnecting the power causes a change from the "radio unit stop status" to the "stop status". Starting the radio unit changes the "radio unit stop status" to the "service status", while terminating the radio unit changes the "service status" to the "radio unit stop status".

Moreover, changing the "stop status" to the "service status" is called "initiate", while changing the "service status" to the "stop status" is called "stop". Furthermore, changing the "service status" back to the "service status" via the "stop status" is called "re-initiate", while changing "the service status" to "the radio unit stop status" and then back to the "service status" is called "resume". In the "radio unit stop status", for the radio unit which includes the transmitter and the receiver, the power of only the transmitter may be stopped.

Figure 3:
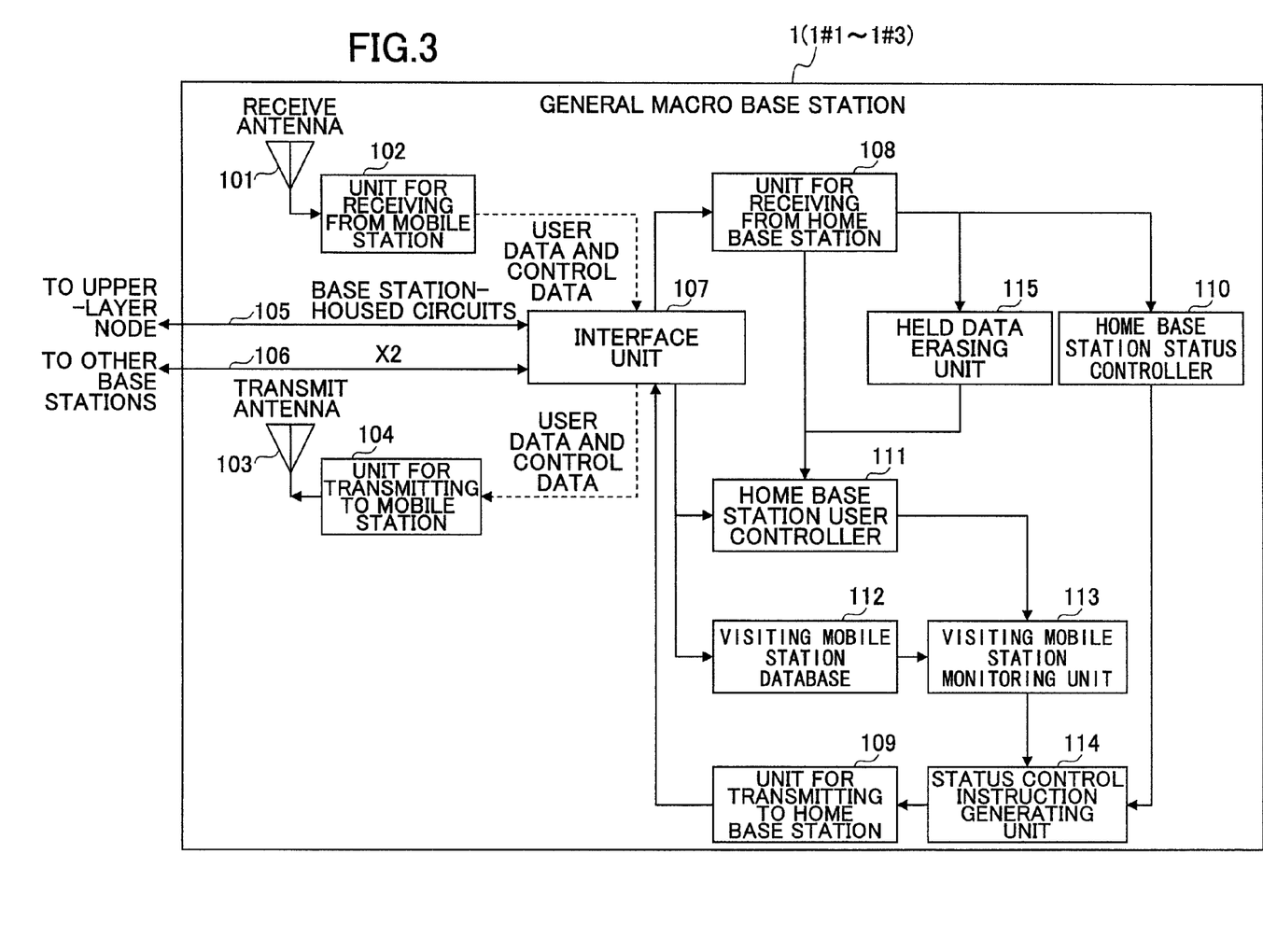
FIG. 3 is a diagram illustrating an exemplary configuration of a general macro base station.

FIG. 3 is an exemplary configuration of a general macro base station 1 (1#1 through 1#3).

In FIG. 3, the general macro base station 1 includes a unit 102 for receiving from a mobile station that receives from a mobile station via a receive antenna 101; a unit 104 for transmitting to mobile station that transmits to a mobile station via a transmit antenna 103; an interface unit 107 which sets base station-housed circuits 105 with an upper-layer node via wired circuits and which sets an X2 interface 106 with other base stations (including a general macro base station and a normal macro base station and home base station) to conduct communications; a unit 108 for receiving from home base station that receives from a home base station via the interface unit 107; and a unit 109 for transmitting to home base station that transmits to a home base station via the interface unit 107. The home base station with which the X2 interface 106 is set is automatically designated as a general macro base station 1 to be monitored.

Moreover, the general macro base station 1 includes a home base station status controller 110 which holds an apparatus status for each home base station based on status reports received, from a home base station to be monitored, via a unit 108 for receiving from home base station; a home base station user controller 111 which holds, for each home base station, an ID (telephone number, etc.) of a mobile station (My UE) owned by a user that is authorized to access a specific home base station, which ID is obtained from other servers, etc., via the interface unit 107; a visiting mobile station database 112 which lists ID and operating status of a mobile station visiting a cell formed by the general macro base station 1; and a visiting mobile station monitoring unit 113 which determines, for a mobile station owned by a user authorized to access a home base station to be monitored that is held at the home base station user controller 111, whether the mobile station is visiting a cell formed by the general macro base station 1.

Here, the visiting mobile station database 112 may list a mobile station which is determined by a network to be visiting a cell formed by the general macro base station 1 based on an own location reported by the mobile station to the network, and information held at the network side, i.e., a location of the general macro base station 1 which is to monitor a specific home base station to which a user who owns the mobile station is authorized to access. Alternatively, a mobile station may hold, in advance, information identifying a general macro base station 1 which is to monitor a specific home base station to which the user who owns the mobile station is authorized to access, so that, when the mobile station finds the general macro base station upon receiving identifying information included in BCH, etc., the mobile station may be listed in the visiting mobile station database 112.

When there are multiple cells being overlaid due to a home cell being located in an overlapping portion between multiple macro cells, multiple general macro base stations may monitor one home base station.

Moreover, the general macro base station 1 includes a status control instruction generating unit 114, which, upon monitoring at the visiting mobile station monitoring unit 113, detects that one of user mobile stations authorized to access a home base station to be monitored has made an entry into or has appeared in a cell formed by the general macro base station 1, and generates a control report which requests that the home base station be changed to the service status when it is in the radio unit stop status, or, conversely, detects that all of user mobile stations that are authorized to access a home base station to be monitored have exited or disappeared from the cell formed by the general macro base station 1, and generates a control report which requests that the home base station be changed to the radio unit stop status when it is in the service status; then requests for transmitting the control report, via the unit 109 for transmitting to home base station, to the home base station. Here, the entry into the cell formed by the general macro base station 1 includes not only what is caused by a movement of a mobile station, but also what is caused by a change in an operational status of the mobile station, e.g., incoming and outgoing calls (a change from being in standby to being in communications). Moreover, the exit from the cell formed by the general macro base station 1 includes not only what is caused by a movement of a mobile station, but also what is caused by a change in an operational status of the mobile station, e.g., call termination (a change from being in communications to being in standby).

The visiting mobile station database 112 may list, in addition to an ID and operating status of a mobile station, information identifying general macro base stations from a common control channel such as a BCH, etc., with the second strongest level and weaker being received, other than a general macro base station from which the common control channel with the strongest level is received at the mobile station (a general macro base station which forms a cell visited by the mobile station). In this way, it may be arranged for the visiting mobile station monitoring unit 113, using a combination of other general macro base stations being visited by the mobile station and, from which general macro base stations, a common control channel such as a BCH, etc., with the second strongest level and weaker being received at the mobile station, to detect that the mobile station has made an entry into or appeared in a cell formed by the general macro base station 1, or, conversely, using a non-formation of the combination, to detect that the mobile station has exited or disappeared from a cell formed by the general macro base station 1. Such an arrangement as described above makes it possible for the general macro base station to more accurately control a status of a home base station with multiple cells overlaid by being located in an overlapping portion between multiple macro cells.

Moreover, the general macro base station 1 includes a held data erasing unit 115 which, while holding an ID of a mobile station owned by a user that is authorized to access a home base station from which a report has been received, via the unit 108 for receiving from home base station, of a change to a stop status due to a power disconnection, invalidates the ID, or which erases the ID from the home base station user controller 111.

Figure 4:
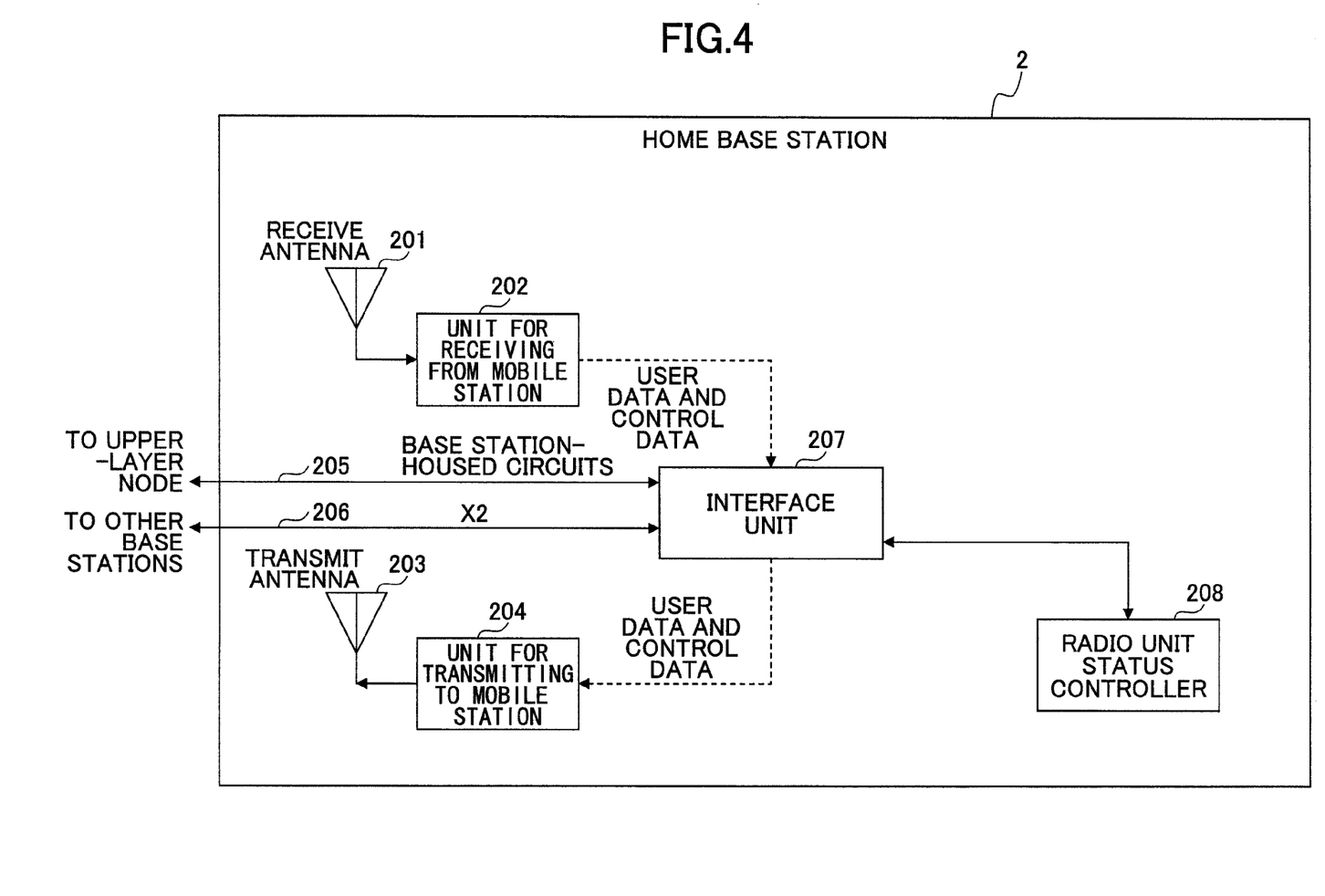
FIG. 4 is a diagram illustrating an exemplary configuration of the home base station.

FIG. 4 is a diagram illustrating an exemplary configuration of a home base station 2.

In FIG. 4, the home base station 2 includes a unit 202 for receiving from mobile station that conducts reception from a mobile station via a receive antenna 201 and a unit 204 for transmitting to mobile station that conducts transmission to a mobile station via a transmit antenna 203.

Moreover, the home base station 2 includes an interface unit 207 for setting base station-housed circuits 205 which are connected to an upper-level node, which transfers control data and user data that are received by the unit 202 for receiving from mobile station, which transfers control data and user data that are transmitted by the unit 204 for transmitting to mobile station, and which performs inputting and outputting of control data with the units within the home base station 2, and for setting an X2 interface unit 206 which is connected to other base stations (including a general macro base station and a normal macro base station and a home base station), which transfers control data and user data in conjunction with a handover, which controls a mobile station, and which performs inputting and outputting of control data with the units within the home base station 2. The interface unit 207 sets the X2 interface 206 with a general macro base station which forms a cell being overlaid.

Furthermore, the home base station 2 includes a radio unit status controller 208 which determines that a control report is received of a status via the interface unit 207 from a general macro base station with which the X2 interface 206 is set to control a status of an own apparatus, which reports a changed status via the interface unit 207 to the general macro base station with which the X2 interface 206 is set, and which, at the time of stopping of an apparatus, requests the general macro base station to dispose of own station information. The radio unit status controller 208, for controlling a status of an own apparatus, changes the status to a service status when a radio unit start report is received from at least one of the general macro base stations with which the X2 interface 206 has been set, and changes the status to a radio unit stop status when a radio unit stop report is received from all of the general macro base stations that form the cell being overlaid.

Operation

Figure 5:
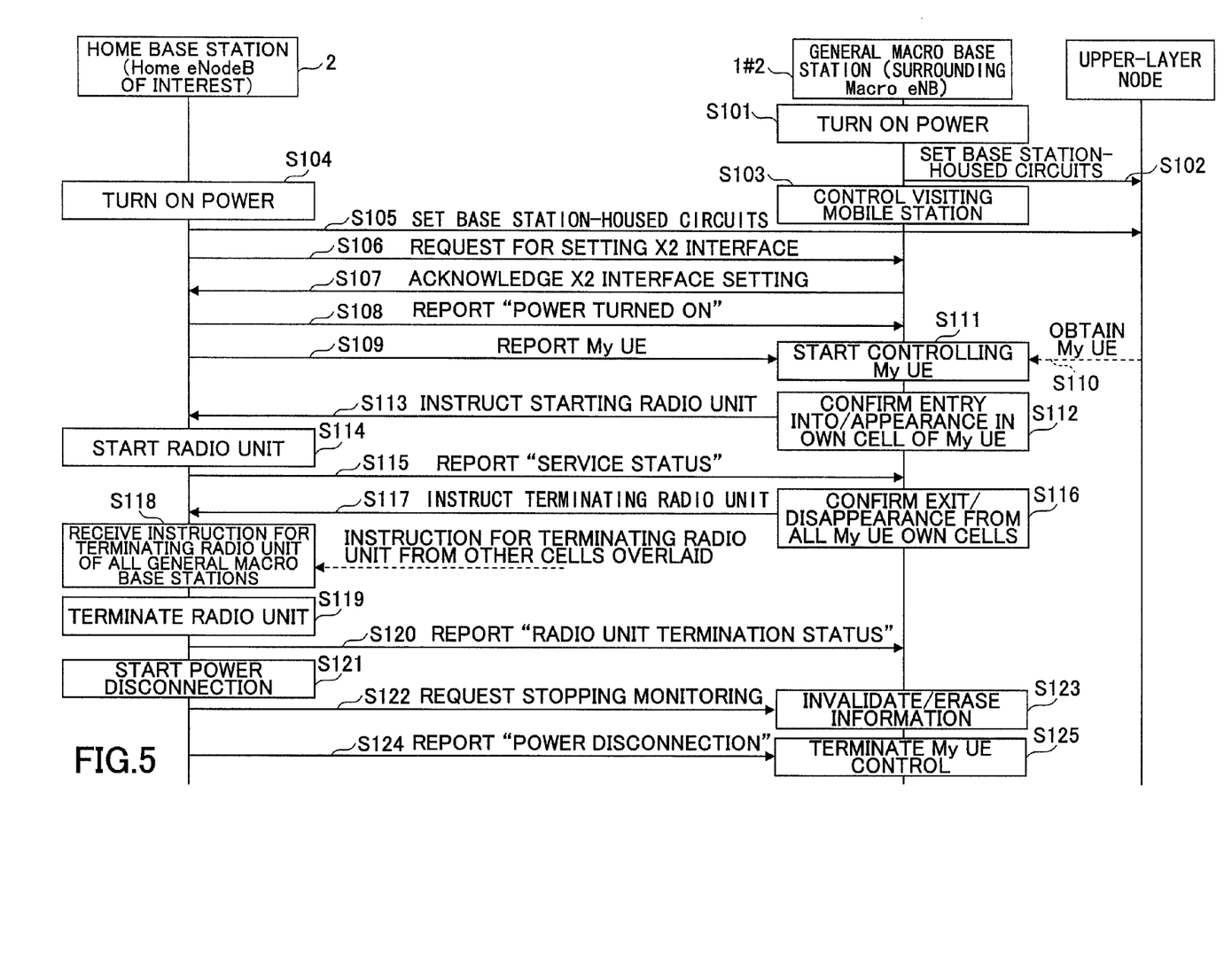
FIG. 5 is a sequence diagram illustrating an exemplary process of the embodiment.

FIG. 5 is a sequence diagram illustrating an exemplary process of the embodiment. As shown in FIG. 1, a situation is assumed such that a home base station 2 exists primarily within a cell of a general macro base station 1#2.

In FIG. 5, when the power is turned on at the general macro base station 1#2 (step S101), the general macro base station 1#2 sets base station-housed circuits with an upper-level node (step S102), and starts controlling a visiting mobile station (step S103).

On the other hand, when power is turned on at the home base station 2 (step S104), the home base station 2 sets base station-housed circuits with an upper-layer node (step S105).

Next, the home base station 2 requests the general macro base station 1#2 to set an X2 interface (step S106), and the general macro base station 1#2 reports, to the home base station 2, an acknowledgement for setting the X2 interface (step S107), so that the X2 interface is set.

Thereafter, the home base station 2 reports, to the general macro base station 1#2, that the power has been turned on (step S108). Thereafter, information on a mobile station (my UE) owned by a user that is authorized to access the home base station 2 is reported to the general macro base station 1#2 (step S109). The report of information on the mobile station may be obtained from an upper-level node based on information identifying the home base station 2 (step S110).

Upon receiving the report, for a location of the mobile station owned by a user that is authorized to access the home base station 2, the general macro base station 1#2 starts visiting control in a cell formed by the general macro base station 1#2 (step S111).

Thereafter, the general macro base station 1#2, upon confirming that any one of user mobile stations authorized to access the home base station 2 has made an entry into or appeared in the cell formed by the general macro base station 1#2 (step S112), an instruction for starting a radio unit is transmitted to the home base station 2 on an assumption that the home base station 2 is in a radio unit stop status (step S113). Upon receiving the instruction, the home base station 2 starts the radio unit to change the status thereof to a service status (step S114) and reports the change to the general macro base station 1#2 (step S115).

Thereafter, the general macro base station 1#2, upon confirming that all of user mobile stations authorized to access the home base station 2 have exited or disappeared from the cell formed by the general macro base station 1#2 (step S116), an instruction for terminating a radio unit is transmitted to the home base station 2 on an assumption that the home base station 2 is in a service status (step S117). Thereupon, if the home base station 2 has received instructions for terminating a radio unit of all general macro base stations that control the home base station 2 (step S118), the home base station 2 terminates the radio unit to change to the radio unit stop status (step S119), and reports the change to the general macro base stations 1#2 (step S120).

Similarly, thereafter, upon confirming that any one of the user mobile stations of users authorized to access the home base station 2 has made entry into or appeared in a cell formed by at least one of the general macro base stations 1#2 that control the home base station 2, the home base station 2 moves to the service status, while, upon confirming that all of the users mobile stations that are authorized to access the home base station 2 have exited or disappeared from cells formed by all of the general macro base stations 1#2 that control the home base station 2, the home base station 2 moves to the radio unit stop status.

Thereafter, when the power disconnection is started at the home base station 2 (step S121), the home base station 2 requests the general macro base station 1#2 to stop monitoring of the home base station (step S122). Thereupon, the general macro base station 1#2 invalidates or erases information associated with the home base station 2 (step S123).

Next, the home base station 2 reports, to the general macro base station 1#2, of a power disconnection (step S124), so that the general macro base station 1#2 terminates monitoring the home base station 2 (step S125). In the present exemplary operation, it is arranged for the home base station 2 with a changed status to make a voluntary report to the general macro base station 1#2. However, it may be arranged for the general macro base station 1#2 to make a periodic request, to the home base station 2, for reporting, and for the home base station 2 to report, with the request as a trigger, a status to the general macro base station #1.

In this way, moving a home base station 2 between a service status and a radio unit stop status depending on whether a user authorized to access the home base station 2 is visiting a cell formed by a general macro base station 1#2 that is located in the vicinity of the home base station 2, and, further, depending on a change of the operational status, makes it possible to perform a service provision as usual when there is a likelihood for a user to use the same, and to reduce wasted power consumption and prevent interference due to a common control channel when there is no likelihood for a user to use the same.

Recapitulation

As described above, the embodiments of the present invention have the following advantages:

(1) Only home base stations with a likelihood of being used may be initiated, making it possible to reduce power consumption.

(2) Transmission at home base stations with no likelihood of being used may be prevented entirely, making it possible to reduce interference to other cells.

(3) The status of the home base station may be automatically controlled, making it possible to reduce the burden on the operation manager.

The present invention has been described in the foregoing according to preferred embodiments of the present invention. While specific examples have been shown to describe the present invention, it is evident that various modifications and changes may be applied thereto without departing from broader spirits and scope of the present invention as defined in the claims. In other words, the present invention should not be construed to be limited by the details of the specific examples and the attached drawings.

The present international application claims priority based on Japanese Patent Application No. 2007-211092, filed on Aug. 13, 2007, the entire contents of which are hereby incorporated by reference.

The invention claimed is:

1. A mobile communications system, comprising:
a first unit, provided at a base station apparatus, which controls a base station status by determining a request from an upper-layer general base station apparatus; and
a second unit, provided at the general base station apparatus, which monitors for one or more mobile station apparatuses entering into/appearing in, or exiting/disappearing from a cell formed by the general base station apparatus, and, if at least one of the mobile station apparatuses enters into/appears in the cell formed by the general base station apparatus, requests for changing the base station apparatus to a service status, and, if all of the mobile station apparatuses exit/disappear from the cell formed by the general base station apparatus, requests for changing the base station apparatus to a radio unit stop status;
wherein the second unit monitors for the one or more mobile station apparatuses entering into/appearing in, or exiting/disappearing from the cell combined with a cell formed by another general base station apparatus; and
wherein the second unit monitors for the one or more mobile station apparatuses entering into/appearing in the cell using a formation of a combination of the cell with another cell formed by another general base station apparatus, and monitors for the one or more mobile station apparatuses exiting/disappearing from the cell using a non-formation of the combination of the cell with the other cell formed by the other general base station apparatus.

2. The mobile communications system as claimed in claim 1, wherein
the second unit monitors for the mobile apparatus which is authorized to access the base station apparatus entering into/appearing in, or exiting/disappearing from the cell formed by the general base station apparatus.

3. A general base station apparatus, comprising:
a unit which monitors for one or more mobile station apparatuses entering into/appearing in, or exiting/disappearing from a cell formed by the general base station apparatus, and, if at least one of the mobile station apparatuses enters into/appears, requests for changing the base station apparatus to a service status, and, if all of the mobile station apparatuses exit/disappear, transmits, to the base station apparatus, a report requesting for changing the base station apparatus to a radio unit stop status;
wherein the unit monitors for the one or more mobile station apparatuses entering into/appearing in, or exiting/disappearing from the cell combined with a cell formed by another general base station apparatus; and
wherein the unit monitors for the one or more mobile station apparatuses entering into/appearing in the cell using a formation of a combination of the cell with another cell formed by another general base station apparatus, and monitors for the one or more mobile station apparatuses exiting/disappearing from the cell using a non-formation of the combination of the cell with the other cell formed by the other general base station apparatus.

4. The general base station apparatus as claimed in claim 3, wherein
the unit monitors for the mobile apparatus authorized to access the base station apparatus entering into/appearing in, or exiting/disappearing from the cell.

5. A method of controlling base station status, comprising the step of:
monitoring for one or more mobile station apparatuses entering into/appearing in, or exiting/disappearing from a cell formed by a general base station apparatus, and, if at least one of the mobile station apparatuses enters into/appears in the cell formed by the general base station apparatus, requesting for changing the base station apparatus to a service status, and, if all of the mobile station apparatuses exit/disappear from the cell formed by the general base station apparatus, requesting for changing the base station apparatus to a radio unit stop status;
wherein the step includes monitoring for the mobile station apparatus entering into/appearing in, or exiting/disappearing from the cell combined with a cell formed by another general base station apparatus; and
wherein the step includes monitoring for the mobile station apparatus entering into/appearing in the cell using a formation of a combination of the cell with another cell formed by another general base station apparatus, and monitoring for the mobile station apparatus exiting/disappearing from the cell using a non-formation of the combination of the cell with the other cell formed by the other general base station apparatus.

6. The method of controlling base station status as claimed in claim 5, wherein
the step includes monitoring for the mobile apparatus authorized to access the base station apparatus entering into/appearing in, or exiting/disappearing from the cell formed by the general base station apparatus.

7. The method of controlling base station status as claimed in claim 5, further comprising the step of
changing the base station apparatus to a radio unit stop status only when it is requested to change to the radio unit stop status from all of upper-layer general base station apparatuses.

* * * * *